May. 6, 1924.

L. C. RIPLEY

VALVE

Filed April 20, 1921

1,493,083

Inventor
Leonard C. Ripley
By J. Beaus Kelly, Attorney

Patented May 6, 1924.

1,493,083

UNITED STATES PATENT OFFICE.

LEONARD C. RIPLEY, OF PHILADELPHIA, PENNSYLVANIA.

VALVE.

Application filed April 20, 1921. Serial No. 462,862.

*To all whom it may concern:*

Be it known that I, LEONARD C. RIPLEY, a citizen of the United States, residing at Philadelphia, in the State of Pennsylvania, have invented certain new and useful Improvements in Valves, of which the following is a specification.

This invention relates to a new and improved valve.

The main object of the invention is to provide a valve especially designed to be used in connection with oil compartments and which is particularly adapted to be used in connection with the oil compartments of ships to automatically permit the escape of gas from the oil compartment and at the same time prevent water or foreign matter from entering the same.

A further object of the invention is to provide a valve of the above type which in addition to providing means to automatically permit the escape of gas from the oil compartment includes, in combination with said means, a vacuum valve to permit the intake of air into the compartment when the same is being emptied.

A still further object of the invention is to provide a valve that is designed for the above purpose that is simple in construction, strong and durable and which it is believed may be manufactured at a reasonably low cost.

Various other objects and advantages of my invention will become apparent during the continuance of the following description.

In the drawings:—

In describing my invention in detail, 10 designates the weather deck of a vessel or any other suitable supporting structure that is provided with an opening 11 which communicates with an oil compartment. Secured to the deck 10 as at 12 about the opening 11 is a circular ring or collar 13 whose upper and outer surface is screw threaded as at 14 for the purpose that will presently appear.

Figure 1:
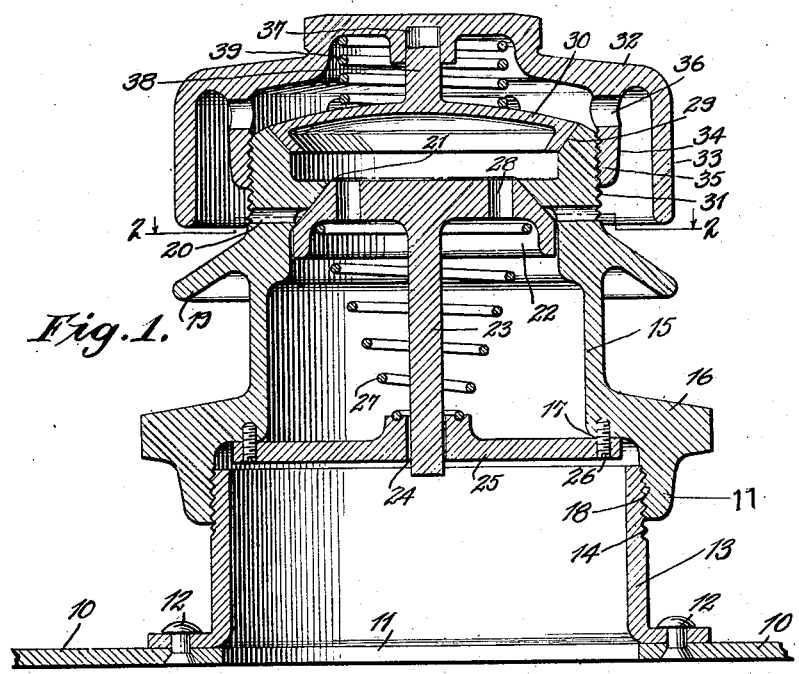
Figure 1 is a view in vertical cross section of my invention showing the same as in its preferred embodiment.

The body portion 15 of the valve casing proper is provided at its lower end with an annular flange 16 from which depends a circular collar 17 which is internally screw threaded as at 18 for engagement with the upper and outer edge of the ring or collar 13 as clearly shown in Figure 1. In other words, by this arrangement the main or body 15 can be screwed upon the ring or collar 13 so as to firmly maintain the valve casing in position.

The diameter of the valve casing 15 is slightly smaller than the diameter of the ring or collar 13, as shown in Figure 1, so as to provide an annular shoulder 17' at the lower end thereof which serves the purpose that will presently appear.

Intermediate its ends and on its outer surface, the body portion 15 is provided with an outwardly and downwardly extending annular flange or guard 19 and immediately above the flange with horizontal openings 20 which communicate with both the outer and inner faces of the body member as clearly shown. Immediately adjacent the inner end of the openings 20, the body member 15 is provided with an annular valve seat 21 designed to be engaged by a valve member 22 which fits snugly against the valve seat when in closed position. the valve seat and valve being so arranged and constructed so that the upward movement of the valve is limited as is clearly shown in Figure 1.

Figure 2:
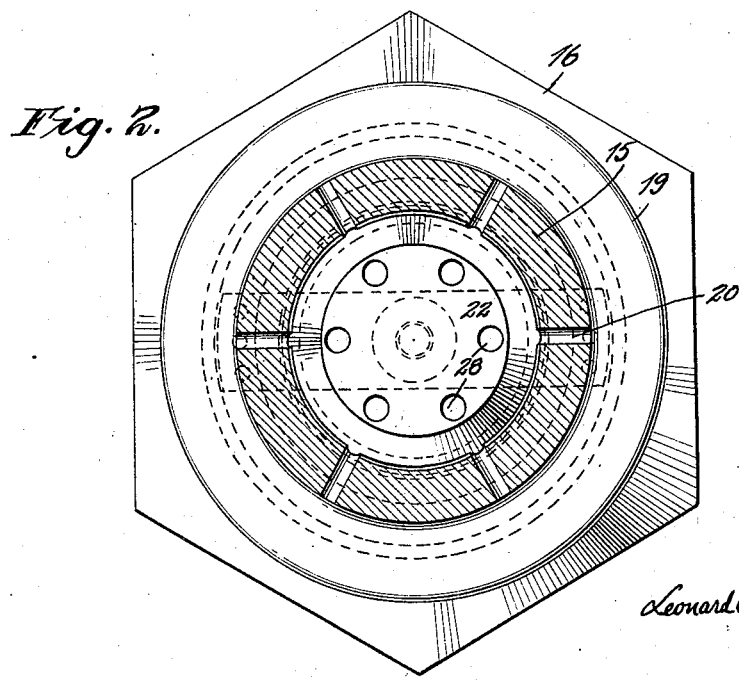
Figure 2 is a view in horizontal cross section taken on line 2—2 of Figure 1.

The valve member 22 carries a depending stem 23 that is slidably mounted through an opening 24 in a cross head 25 that is fixedly carried by the body member 15 as at 26, on the shoulder 17' and the valve is normally held in its uppermost position, that is, in engagement with the valve seat 21 by means of an expansion spring 27 that bears against the valve and the intermediate portion of the cross head 25. As will be observed upon reference to Figures 1 and 2, the valve member 22 is provided with vertical openings 28 that are always open and permit communication between the lower and upper portions of the body member 15. When in a seated or closed position, the valve member 22 is of such construction that it will close the horizontal openings 20 but when in an unseated or open position, it will be observed that air may enter the openings 20 and pass into the lower portion of the body member 15 and hence through the ring or collar 13 and the opening 11 through an oil compartment, through the vertical opening 28 or about the valve member. The valve member 22 is adapted to be automatically unseated or opened when a vacuum is created in the oil compartment so as to permit air to enter the oil compartment and thus facilitate the withdrawal of the oil therefrom.

The inner surface of the upper end of the body member 15 is formed to a valve seat 29 for the reception of a crown-shape pressure actuated valve member 30 and the outer surface of the body member adjacent the valve seat is screw threaded as at 31 for the purpose that will presently appear.

A circular hood or cover 32 is provided whose outer or circumferential head is formed to a depending annular flange 33 which overlies the upper portion of the body member 15 as clearly shown in Figure 1. The hood or cover 32 is further provided, on its under side and in spaced relation to the flange 33, with a second annular flange 34 of less diameter than the flange 33 which is provided with internal screw threads 35 whereby the hood or cover can be screwed upon the upper end of the body member 15 as clearly shown in Figure 1. Horizontal openings 36 are provided in the annular flange 34 to be above the upper end of the body member 15 and normally open.

Adjacent a central point on the under side thereof, the hood or cover 32 is provided with an inverted socket 37 which is adapted to receive the upwardly projecting shank 38 of the pressure actuated valve 30 so as to maintain the valve in alignment with the valve seat at all times. An expansion spring 39 is interposed between the hood or cover 32 and the pressure actuated valve 30 so as to normally maintain the valve in a seated position.

When a pressure is generated from the oil compartment, it will act through the vertical openings 28 of the valve member 22 on the valve member 30 so as to unseat the same whereby the accumulated gases will pass upwardly through the openings 28, past the valve member 30 and outwardly through the horizontal openings 36 in the flange 34.

It will be observed that by reason of the position of the depending flange 33 of the hood or cover 32 and the flange 19 of the body member 15, that sea water washing over the deck of the vessel will not enter the oil compartment and will be deflected away from the openings 36. It will also be observed that if any water should enter the openings 36 that by reason of the crown shape of the valve member 30, it would run off again through the openings and would not accumulate on top of the valve.

Inasmuch as the oil within the compartment is not dispensed when the vessel is at sea, it will be noted that the valve member 22 will not become unseated when there is any danger of water entering the openings 20.

From the foregoing it is believed that the advantages and novel features of my invention will be readily understood and therefore further detailed description is deemed unnecessary.

What is claimed is:—

A device of the character specified comprising a tubular valve body having the bore provided with vertically spaced upper and lower valve seats and having the side wall pierced with air inlet openings having their inner termini in the surface of the lower seat, a pressure actuated valve engaging the upper seat, a vacuum actuated valve engaging the lower seat and normally closing the said air inlets or openings, said vacuum actuated valve being pierced with vertical pressure-passages discharging upon the lower side of the upper or pressure actuated valve, and an annular downwardly sloping flange encircling the valve body below the said air inlet openings, and valve tensioning means for the said upper valve including a hood having pressure outlet openings and an integral depending flange disposed forwardly of the said outlet and the said inlet openings in co-operative relation to the said sloping flange to provide a shield for deflecting water away from the said openings.

In testimony whereof I affix my signature.

LEONARD C. RIPLEY.